United States Patent [19]
Flinton

[11] Patent Number: 5,855,269
[45] Date of Patent: Jan. 5, 1999

[54] VIBRATORY CONVEYOR DEVICE

[75] Inventor: Brian Thomas Flinton, Scarborough, United Kingdom

[73] Assignee: McCain Foods (GB) Limited, Scarborough, United Kingdom

[21] Appl. No.: 547,425

[22] Filed: Oct. 24, 1995

Related U.S. Application Data

[63] Continuation of Ser. No. 372,848, Jan. 13, 1995, abandoned, which is a continuation of Ser. No. 136,312, Oct. 13, 1993, abandoned.

[30] Foreign Application Priority Data

Oct. 13, 1992 [GB] United Kingdom ............ 9221418

[51] Int. Cl.⁶ .................................................. B65G 47/46
[52] U.S. Cl. ..................................................... 198/369.7
[58] Field of Search ................................. 148/358, 586, 148/609, 369.7

[56] References Cited

U.S. PATENT DOCUMENTS

| | | | |
|---|---|---|---|
| 3,214,002 | 10/1965 | Kirkpatrick et al. | 198/586 |
| 3,426,886 | 2/1969 | Aro | 198/586 |
| 4,429,517 | 2/1984 | Lohrentz et al. | 198/370 |
| 4,478,329 | 10/1984 | Heiz | 198/586 |
| 5,183,143 | 2/1993 | Sullivan | 198/609 |

FOREIGN PATENT DOCUMENTS 2010 106  6/1979  United Kingdom .

*Primary Examiner*—Joseph E. Valenza
*Attorney, Agent, or Firm*—Seyfarth, Shaw, Fairweather & Geraldson

[57] ABSTRACT

A materials handling device comprising a cascade of vibrating conveyors (61, 71, 81), each upstream conveyor (61, 71) being nestable in an adjacent downstream conveyor (71, 81) with clearance, and at least one of any two adjacent conveyors being movable relative to the other conveyor from a nested condition in which product is conveyed from the upstream conveyor to the adjacent downstream conveyor to a separated condition in which product falls from the upstream conveyor into a gap formed between the upstream and downstream conveyors. The invention avoids mechanical gates which are noisy, unreliable and are liable to trap the product being conveyed.

17 Claims, 2 Drawing Sheets

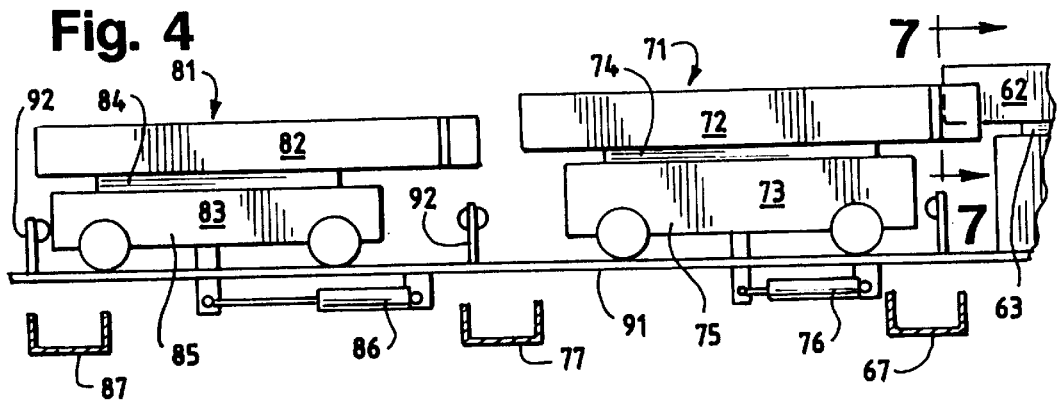
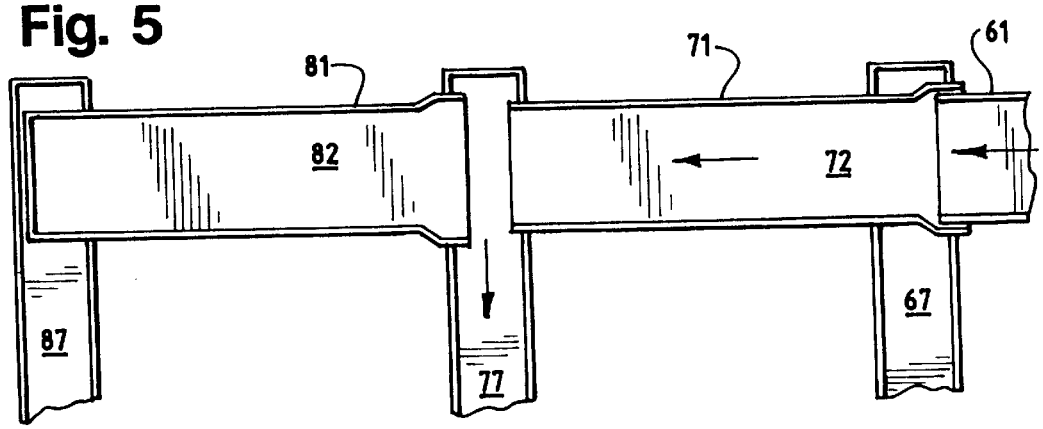
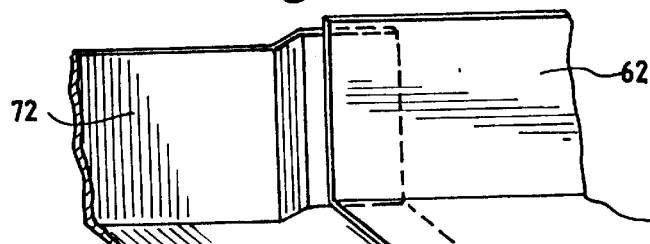
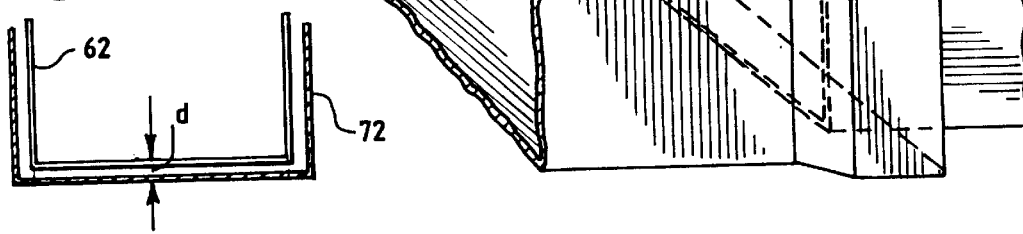

VIBRATORY CONVEYOR DEVICE

This is a continuation of application Ser. No. 08/372,848, filed Jan. 13, 1995, now abandoned, which is, in turn, a continuation of application Ser. No. 08/136,312, filed Oct. 13, 1993, now abandoned.

BACKGROUND OF THE INVENTION

This invention relates to a materials handling device and is particularly, though not exclusively, concerned with vibratory conveyors.

Vibratory conveyors are used in many industries to move various (usually small) items from one location to another. Such conveyors usually comprise a trough mounted on a relatively massive base by means which permit the trough to be rhythmically pulsed, thereby to move items from one end of the trough to the other.

It will be appreciated that these conveyors are especially suitable for transporting food products since the trough may be of simple form and is relatively easily and economically manufactured from stainless steel or aluminum. Such troughs are also easy to clean and provide minimal obstruction to the passage of items therealong.

Vibratory conveyors are used in continuous food manufacturing processes, for example to transport frozen french fries to weighing and packing stations. Typically a series of three vibratory conveyors may be provided in line and having small gaps therebetween bridged by gates. The gates open under command to allow french fries to drop onto means for conveying the fries to one of several weighing stations. Only one weighing station is supplied at a time and the gates accordingly open and close rather frequently. Such apparatus may be in continuous use 6 days a week and for 24 hours each day, and must thus be entirely reliable since otherwise the entire preparation and packing line may come to a halt.

A typical prior art conveyor is described in detail below.

The gates of such vibratory conveyors undergo considerable stress due to the necessary vibration of the mechanism; they frequently suffer cracks and breakage. Many attempts have been made to mitigate these effects but none has been entirely successful.

The prior art gates also suffer other disadvantages in that closing of a gate may trap the product between adjacent faces of the gate and conveyor, leading to misshaped or broken product and potential jamming of the gate mechanism. Prior art gates may also require stiffeners to ensure adequate strength and rigidity, but such stiffeners obstruct the free movement of product.

A further disadvantage is that the gates rattle and thus the noise level in the immediate vicinity of the gate mechanism is extremely high mainly because the gate vibrates in its mounting and on the upstream conveyor bed. This is of considerable concern but to date no adequate method of noise reduction has been found which is reliable and effective.

Yet another disadvantage is that as the gates pivot upward (while loaded with product) they tend to throw product over the side of the conveyor; this is undesirable and dangerous and makes the mechanism especially unsuitable for a food factory.

Notwithstanding the very considerable disadvantage of vibratory conveyors with gates, these mechanisms have become the standard for use in many industries and particularly in the food industry.

SUMMARY OF THE INVENTION

The present invention provides a novel arrangement of vibrating conveyors which overcomes the aforementioned problems.

According to the invention there is provided a vibrating conveyor apparatus comprising two or more vibrating conveyors reciprocal relative to one another from a first condition, in which one conveyor is adapted to feed another, to a second condition in which the conveyors are spaced apart to define a gap in the conveying direction. In the second condition the one conveyor cannot feed the other, but instead product transported along said one conveyor falls through the gap.

In a preferred embodiment, the conveyors are generally horizontal but spaced from one another in the vertical direction in the manner of a cascade such that the exit of an upstream conveyor is above the entrance of a downstream neighbor.

In a preferred embodiment one conveyor is fixed against movement. Several movable conveyors may be provided in sequence, the conveyors being movable relative to each other to define gaps therebetween. One or more of the movable conveyors may be mounted on wheeled trucks and be movable under the control of mechanical or fluid actuators.

The conveyors may be arranged in line and include troughs along which product is conveyed, the ends of adjacent troughs being formed to permit nesting of one trough within another with substantial clearance. Preferably such conveyors are arranged with each succeeding trough being lower than its predecessor, thereby permitting adjacent troughs to have substantially flat trough bases.

The invention permits the conveyors to feed product either through the gap defined when adjacent conveyors are apart, or from one conveyor to the next. In one particular embodiment product is fed from a fixed conveyor to a series of two movable conveyors, thereby giving the possibility of creating conveyor gaps between the first and second, and between the second and third conveyors, and of feeding product from the end of the third conveyor. Any combination is however possible and there is no reason why a fixed conveyor should not be last in sequence or at an intermediate position. Furthermore, particular circumstances may require each conveyor in the sequence to be movable.

Preferably the movable conveyors are guided on fixed rails and between stops.

The invention provides vibrating conveyor apparatus which provides a plurality of feed gaps without the necessity of the prior art gates. No mechanical link between adjacent conveyors is necessary and the mechanical stress and noise is substantially reduced. In the preferred embodiment product passes from one conveyor to the next under the influence of gravity and thus undergoes minimal damage; most importantly, conveyors having troughs define a substantial clearance therebetween in the nested condition, thereby ensuring that no product can be squashed or otherwise damaged as is the case with the prior art gates. Gates do not become fouled by damaged or trapped product.

DESCRIPTION OF DRAWINGS

Other aspects of the invention will be apparent from the following description of a preferred embodiment shown by way of example only in the accompanying drawings, in which:

FIG. 4 is a schematic side elevation of an arrangement according to the present invention;

FIG. 5 is a plan of the arrangement of FIG. 4;

FIG. 6 is an enlarged isometric view of two adjacent conveyors illustrated in FIG. 4; and FIG. 7 is an enlarged cross-section on line 7—7 of FIG. 4.

DETAILED DESCRIPTION

Figure 1:
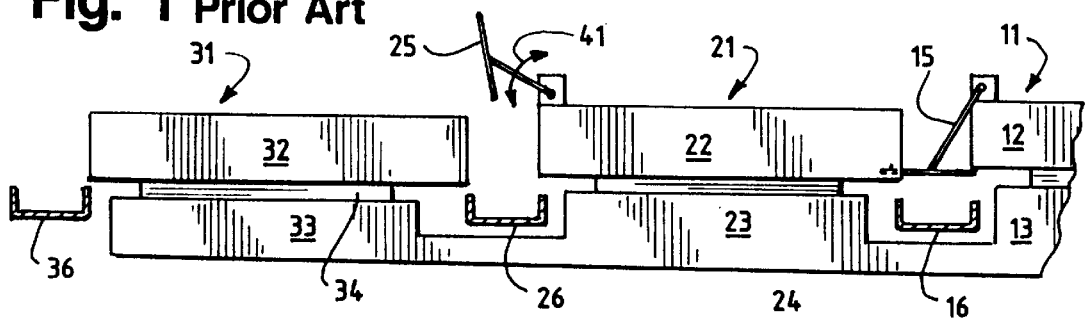
FIG. 1 is a schematic side elevation of a prior art vibratory conveyor system with gates.
Figure 2:
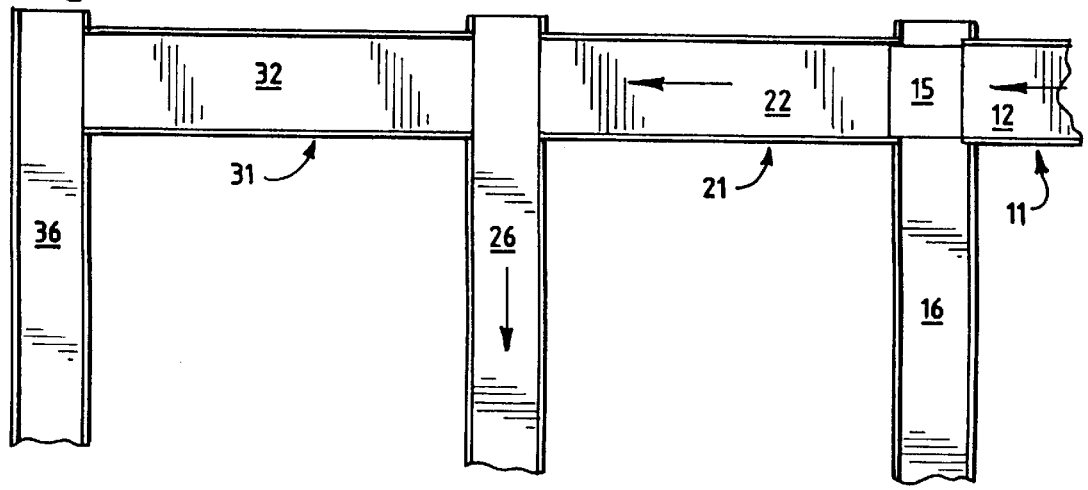
FIG. 2 is a plan of the system of FIG. 1 showing also conveyors to the weighing stations.
Figure 3:
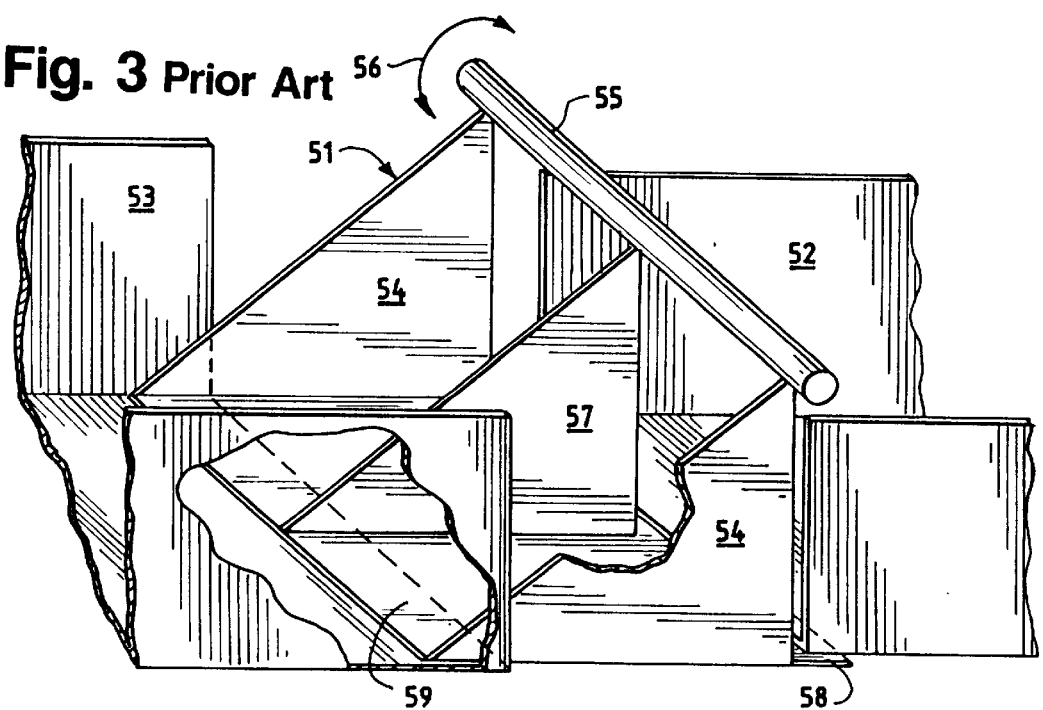
FIG. 3 is a partially cut away isometric view of a prior art conveyor gate.

With reference to FIGS. 1–3, the drawings illustrate a prior art vibratory conveyor system with gates. A first conveyor 11 comprises a trough 12 mounted on a base 13 by a vibrating mechanism 14. Vibrating mechanisms are well known and will not be further described here, but are capable of vibrating small items from one end of the trough to the other (indicated by arrows).

Spaced from the first conveyor 11 is a second conveyor 21 and a third conveyor 31 each comprising a trough 22, 32 and an individual vibrating mechanism 24, 34.

The small gap between each conveyor may be closed by drop down gates 15, 25 as illustrated (gate 25 is not shown in FIG. 2). The gates are pivoted above the respective troughs 12, 22 and move in the direction indicated by arrow 41 under the control of individual pneumatic actuators.

As shown in FIG. 1 each successive trough is slightly lower than its predecessor to allow the gate to pass under the end lip of the upstream conveyor and to rest above the end lip of the downstream conveyor.

Although not illustrated in FIG. 1, the gates have sides to prevent loss of product.

Below each gate and below the lip of trough 32 are vibratory conveyors 16, 26, 36 for conveying product to individual weighing stations (not illustrated).

As shown in FIG. 1, gate 15 is closed and gate 25 open, thus allowing product to fall from the end of trough 22 onto conveyor 26.

Operation of the gate 15, 25 and vibrating mechanisms 14, 24, 34 is typically under the control of an apparatus which detects that an adequate amount of product is being supplied to each weighing station that is in operation.

Such apparatus may include photocell detectors or the like to detect the presence or absence of product at the upstream end of conveyors 11, 21, 31, 16, 26 and 36 and under the control of a logic circuit. The vibrating mechanisms 14, 24, 34 and gates may thus be operated individually or in combination to ensure that product is supplied as required.

The gates 15, 25 have no vibrating mechanism of their own but by virtue of being mounted on the upstream trough the continuous movement of product is assured.

FIG. 3 illustrates a typical prior art gate 51 located in the down position between an upstream trough 52 and a downstream trough 53. The gate has sides 54 extending upwards to a transverse beam 55 pivoted for rotation by any suitable means on the upstream trough 52 and for arcuate movement as illustrated by arrow 56. The gates include a central stiffener 57 of the same general form as each of the sides 54.

A rearward extension 58 of the trough base 59 extends just under the end lip of the upstream trough 52; the extension both ensures continuity of the conveying surface and acts as a stop for the gate. At the downstream end the gate rests above the downstream trough as illustrated.

The sides 54 are made sufficiently high to ensure product is kept within the conveying path.

The disadvantages of the pivoting gate arrangement are that:

1. Product is trapped between the extension 58 and upstream trough 52, and between the base 59 and down between trough 53;
2. Product builds up against the upstream edge of the stiffener 57; this is especially acute where product having a long length/thickness ratio is being conveyed (e.g. french fries); and
3. The gate is subjected to vibrating from both the upstream and downstream troughs, which vibration may be of different frequencies; this results in excessive noise and a high rate of material failure due to stress cracks.

Prior art gates have typically been manufactured from aluminum to minimize the incidence of stress cracking. New food plants are however often required to be manufactured from stainless steel which, being a much harder material, is very prone to stress cracking and much more difficult to repair.

The invention will now be described with reference to FIGS. 4–7.

A series of three vibrating conveyors 61, 71, 81 are arranged in line as illustrated. Each conveyor has a respective trough 62, 72, 82. The base 63 of the upstream conveyor 61 is fixed whereas the middle and downstream conveyors 71, 81 are mounted on trucks 75, 85 as shown, each truck having four wheels and being mounted on parallel rails for fore and aft movement. A respective mechanical actuator 76, 86 is operable to move each truck 75, 85 a limited distance along the rails 91 (rails 91 are omitted from FIG. 5). End stops 92 limit and cushion truck travel. Vibratory conveyors 67, 77, 87 are provided, as in the prior art embodiment, to feed product to weighing stations. As best illustrated in FIG. 5, the sides of the inlet ends of the downstream and middle troughs 72, 82 are bent outwardly so that one trough can rest within the following trough. Each succeeding trough is also slightly lower than its predecessor to maintain the trough base flat while permitting nesting.

FIG. 6 is an enlarged somewhat schematic view of two nested troughs 62, 72 while FIG. 7 illustrates the substantial clearance "d" between the walls of the upstream trough 62 and the downstream trough 72.

In operation, and with reference to FIGS. 4 and 5, the trucks 75, 85 are moved back and forth by the actuators 76, 86 under the command of a control mechanism similar to that provided for the prior art embodiment.

As illustrated, product passes from conveyor 61 to conveyor 71. Actuator 76 is retracted allowing product to drop onto feed conveyor 77. The vibrating mechanisms 64 and 74 operate independently to shake product in the conveying direction. The clearance between troughs 62, 72 is substantial, as illustrated in FIG. 7, and this feature ensures that no product becomes trapped between the nested sections of troughs 62, 72; thus no product can be squashed or otherwise damaged. The clearance "d" is set according to the size and kind of product being conveyed. As illustrated, when feeding conveyor 77, the vibrating mechanism of through 82 may be switched off.

Clearly, the conveyors 67, 77, 87 may be feed in any desired sequence by appropriate positioning of the trucks 75, 85. The arrangement has the undisputed advantage that:

1. There are no contact faces to squash or damage product.
2. The conveying paths are unobstructed.
3. There is no mechanical connection or abutment between adjacent troughs—this ensure less mechanical stress, and most importantly, less noise.

4. No gates are required, and thus there is no risk of product being thrown from the conveying path.
5. The clearance between the nested trough portions are not critical so long as they are large enough to ensure that no product can be trapped or jammed.

Many changes may be made to suit the particular circumstances of each installation without departing from the invention disclosed herein.

What has been described, therefore, is an improved vibratory conveyor apparatus. While a preferred embodiment of the invention is described, it is understood that the invention is not defined thereby, but, instead, by the following claims.

What is claimed is:

1. A vibratory conveyor apparatus comprising at least one upstream conveyor trough having a bottom portion and an exit end for feeding items therefrom, at least one downstream conveyor trough adjacent to and downstream from said upstream conveyor trough and having a bottom portion and an entrance end for receiving items and an exit end for feeding items therefrom, means for vibrating separately each of said conveyor troughs, means for movably supporting each conveyor trough and its associated means for vibrating for movement parallel to the path of conveyance, and means for moving at least one of the adjacent conveyor troughs parallel to the conveyace path and relative to the other, whereby in a first condition the upstream conveyor trough is positioned to feed items to the adjacent downstream conveyor trough, and in a second condition the upstream conveyor trough and the downstream conveyor trough are spaced apart to define a gap between the exit end of the upstream conveyor trough and the entrance end of the adjacent downstream conveyor trough, said upstream conveyor trough having a portion including the exit end thereof nesting within a portion including the entrance end of the downstream conveyor trough in the first condition, the entrance end of the downstream conveyor trough being larger than the exit end of the upstream conveyor trough such that there is sufficient clearance between the bottom portion of the downstream conveyor trough and the bottom portion of the upstream conveyor trough to permit the adjacent conveyor troughs to be moved relative to each other between the first condition and the second condition.

2. The apparatus of claim 1 wherein the conveyor troughs feed items in the same conveying direction.

3. The apparatus of claim 1 wherein the conveyor troughs are generally horizontal.

4. The apparatus of claim 3 wherein the conveyor troughs feed items in the same conveying direction.

5. The apparatus of claim 1 wherein at least one of the conveyor is substantially fixed against movement, other than vibration, relative to any other conveyor troughs.

6. The apparatus of claim 1 wherein the means for moving any two adjacent conveyor relative to each other comprises a set of wheels on which at least one of the conveyor troughs is mounted.

7. The apparatus of claim 6 wherein the means for moving any two adjacent conveyor troughs relative to each other includes a track for guiding the wheels.

8. The apparatus of claim 1 wherein fixed stops are provided to limit the relative movement of any two adjacent conveyor troughs.

9. The apparatus of claim 7 wherein fixed stops are provided to limit the relative movement of any two adjacent conveyor troughs.

10. The apparatus of claim 1 wherein the first conveyor troughs has at least an exit end for feeding items therefrom and each additional conveyor troughs has an item conveying trough having an entrance end and an exit end, each of said troughs having a portion including the exit end thereon nesting within a portion including the entrance end of the trough adjacent thereto and downstream thereof in the first condition.

11. The apparatus of claim 10 wherein each downstream trough is of substantially constant cross-section but is widened at its entrance end to accommodate the nesting portion of the trough adjacent thereto and upstream thereof.

12. The apparatus of claim 4 wherein the first conveyor includes an item conveying trough having at least an exit end for feeding items therefrom and each additional conveyor has an item conveying trough having an entrance end and an exit end, each of said troughs having a portion including the exit end thereon nesting within a portion including the entrance end of the trough adjacent thereto and downstream thereof in the first condition.

13. The apparatus of claim 4 wherein at least one of the conveyors troughs is substantially fixed against movement relative to any other conveyor troughs.

14. The apparatus of claim 7 wherein at least one of the conveyor is substantially fixed against movement relative to any other conveyor troughs.

15. The apparatus of claim 9 wherein at least one of the conveyor is substantially fixed against movement relative to any other conveyor troughs.

16. The apparatus of claim 11 wherein at least one of the conveyors is substantially fixed against movement relative to any other conveyor.

17. The apparatus of claim 1 wherein at least one of the conveyors is substantially fixed against movement relative to any other conveyor troughs.

\* \* \* \* \*